Figure 1:
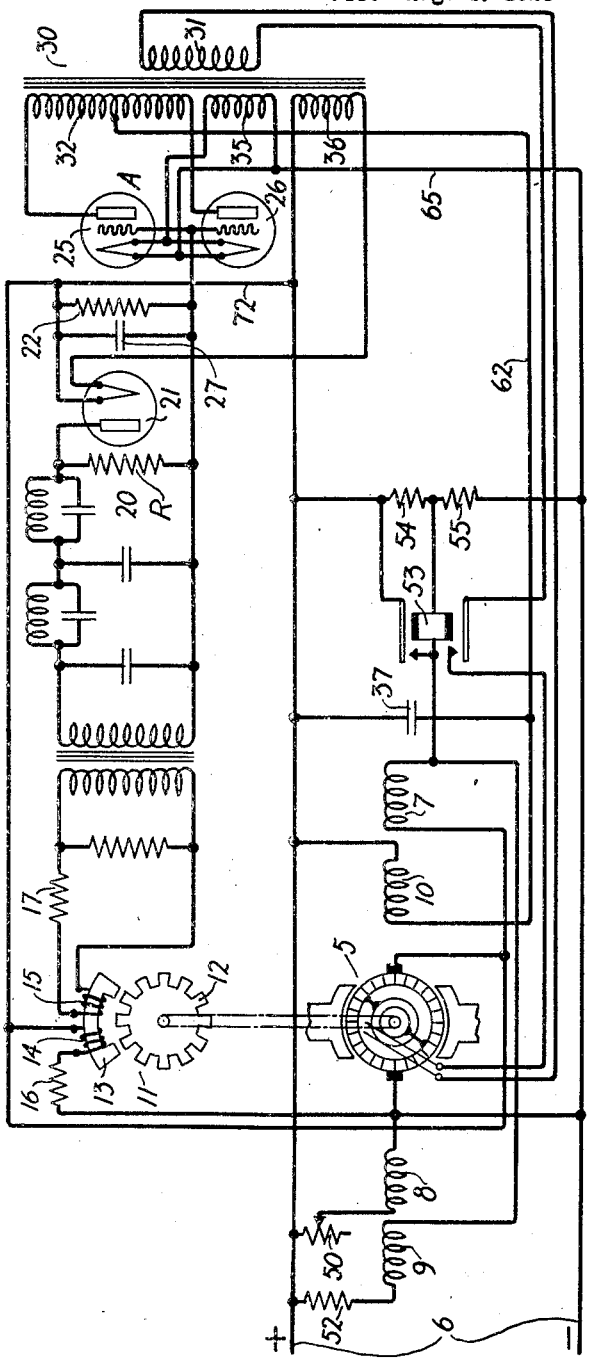

March 13, 1928.

H. M. STOLLER ET AL

ELECTRIC REGULATOR

Filed Aug. 4, 1926

1,662,084

Inventors: Hugh M. Stoller
Edmund R. Morton
by W. Griggs
Attorney

Patented Mar. 13, 1928.

1,662,084

UNITED STATES PATENT OFFICE.

HUGH M. STOLLER, OF MOUNTAIN LAKES, NEW JERSEY, AND EDMUND R. MORTON, OF NEW YORK, N. Y., ASSIGNORS TO WESTERN ELECTRIC COMPANY, INCORPORATED, OF NEW YORK, N. Y., A CORPORATION OF NEW YORK.

ELECTRIC REGULATOR.

Application filed August 4, 1926. Serial No. 127,050.

This invention relates to regulating systems and aims to control, or to regulate precisely, mechanical or electrical characteristics, as for example, speed, frequency or voltage.

As a specific example of applications of the invention, there is described hereinafter the operation of an electric system embodying one form of the invention in controlling the starting of a D. C. electric motor and in maintaining the motor speed sensibly constant.

Our copending application Serial No. 124,599, filed July 24, 1926, discloses a system for regulating the speed of a direct current motor. In that system, a high frequency generator is driven from the motor, for supplying alternating E. M. F. to a tuned circuit from which a potential changing with changes in the generator frequency is applied to the grid of a vacuum tube detector. A vacuum tube amplifies the resulting changes in the plate current of the detector, and the motor speed is regulated by passage of the amplifier plate current through a regulating field winding on the motor. The adjustment of the system is such that at normal motor speed the generator frequency corresponds to a point of positive slope on the steep portion of the resonance curve of the tuned circuit. Change in the motor speed and consequently in the generator frequency, causes the potential applied from the tuned circuit to the detector grid to vary in such manner that the resulting change in current in the regulating field winding of the motor checks the change in the motor speed. Plate current for the rectifier and for the amplifier is supplied from slip rings on the motor, the detector and the amplifier each rectifying its own plate current.

In the specific form of the instant invention shown in the drawing the motor to be regulated drives a high frequency generator, for supplying E. M. F. to the plate of an electric space discharge rectifier tube through a low pass filter which has a sharp cut-off at a frequency slightly below the frequency which the generator delivers at normal speed of the motor. In the rectifier plate circuit is a coupling resistance shunted by a high frequency by-pass condenser. The voltage across the resistance is applied to the grids of two electric space discharge amplifier tubes, the grids of the amplifier tubes being connected directly together. The motor speed is regulated by passage of the plate current of the amplifier tubes through a regulating field winding on the motor. The plate current for the amplifier tubes is supplied from slip rings on the motor, these tubes serving as a full wave rectifier of the current from the slip rings. The constants of the system are such that at normal motor speed the generator frequency is slightly above the cut-off frequency of the filter and corresponds to a point on the steep, negatively sloping portion of the voltage-frequency characteristic of the generator and the filter combined. Change in the motor speed and consequently in the generator frequency, causes the potential applied from the filter to the rectifier plate to vary in such manner that the resulting change in current in the regulating field winding of the motor checks the change in the motor speed. The line voltage is applied to the grids of the amplifier tubes, through the coupling resistance, as a positive biasing potential, causing the grids of the amplifier tubes to go positive, at frequencies considerably above and below the filter cut-off frequency, and therefore permitting the current in the regulating field winding, and the regulating range of the system to be large. The low pass filter enables the system to control the motor at speeds both above and below that corresponding to the critical or cut-off frequency of the filter and to bring the motor speed to the normal value even in case abnormal operating conditions force the speed from the normal value to a value below or above that corresponding to the critical frequency of the filter.

High frequency is used on the plate of the rectifier tube. An advantage of this is that it permits the use of two amplifier tubes, working on opposite half waves of the low frequency power supply. The use of two tubes in this manner requires a steady voltage across the coupling resistance. By using high frequency on the plate of the rectifier tube, the production of low frequency pulses in the space current is avoided, and the voltage across the coupling resistance may readily be made a continuous voltage with only a negligibly small high frequency ripple. If a low frequency were used, and the by-pass condenser across the coupling resistance were made very large in an attempt to suppress low-frequency pulses, the high capacity of the by-pass condenser would tend to render the regulating action of the system sluggish, and tend to cause hunting in the motor speed. Moreover, the cost and the requisite mounting space for the large by-pass condenser would be considerably greater than for the small by-pass condenser which is adequate for smoothing out the voltage across the coupling resistance when the frequency of the rectifier plate voltage is high. Having the cut-off frequency of the filter high facilitates making the time constants of the impedance elements of the filter such as to give the filter cut-off the requisite sharpness for obtaining sensitive regulating action of the system. By employing the two amplifying tubes, the power output for use in the motor regulating field is made large, and is also made continuous so that pulsations in the field current can be readily avoided by a comparatively small condenser in shunt to the field. By making this condenser small quick action of the regulator system is obtained and any tendency to cause hunting is avoided.

In connection with a motor driving an A. C. generator to produce high frequency waves for use in regulating a characteristic such as those mentioned above, a specific aspect of one feature of the instant invention relates to supplying waves from the generator through a low pass filter to an electric space discharge tube, the space current from which is used in effecting the desired regulation.

One feature of the instant invention relates to supplying high frequency waves to the plate circuit of an electric space discharge rectifier tube, and rendering a substantially continuous E. M. F. which is obtained from that circuit and which is used in effecting regulation of a characteristic such as those mentioned above.

One feature of the instant invention relates to obtaining a large range of regulation, in a system employing an electric space discharge amplifying tube for regulating a characteristic such as those mentioned above, by causing an impedance control element of the tube to assume a positive biasing potential when the regulated characteristic assumes either a value below or a value above a given range of values.

Other objects and features of the invention will be apparent from the following description and claims.

Figure 2:
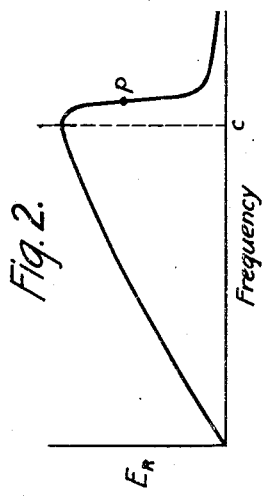

Fig. 1 is a circuit diagram of a system embodying one form of the invention and Fig. 2 is a curve for facilitating explanation of the invention.

In the following description of the specific form of the invention shown in the drawing, a specific set of values of speeds, frequencies, capacities, resistances, etc., is mentioned, by way of example only.

In the drawing is shown an electric motor 5 which is to have its speed held constant at, for example, 1200 R. P. M., regardless of changes in operating conditions, such as changes in the voltage delivered by line 6 which supplies power for the operation of the motor, changes in the load (not shown) on the motor, changes in temperature, etc. The motor is shown as a direct current compound wound dynamo-electric machine which has, in addition to its permanent series field winding 7 and its shunt field winding 8, an auxiliary series field winding 9 used in starting the motor and an auxiliary regulating field winding 10 under control of a vacuum tube regulator described hereinafter. All of these field windings are accumulative. An alternator 11 producing a high frequency, as for example 720 cycles at 1200 R. P. M., is driven from the motor. The alternator is shown as a small inductor type generator such as is disclosed in our copending application mentioned above. The generator comprises a toothed rotor 12, and a stator 13 on which is an exciting winding 14 and an armature winding 15. A resistor 16 is included in series with the winding 14 for adjusting the value of the current in that winding. A resistor 17 is included in series with winding 15 to adjust the value of the normal current output from that winding.

The 720 cycle current from the generator passes through a low-pass filter 20 which transmits readily any frequency up to 700 cycles per second and has a sharp cut-off on higher frequencies. The filter is terminated by a resistance R. The output voltage from this filter is impressed upon the plate of an electric space discharge detector tube 21 which through a coupling resistance 22 having by way of example a value of 100,000 ohms, varies the grid potential of an amplifier A comprising two three electrode space discharge tubes 25 and 26. A condenser 27 connected across resistance 22 suppresses the voltage fluctuations across the resistance, of frequency of the order of the frequencies delivered by generator 11. This condenser may have a capacity of, for example, .01 mf. The current for the motor regulating field 10 passes through the space discharge paths of the amplifier A, so that the amplifier varies the current through the regulating field as described hereinafter. The power supply for the filament of tubes 21, 25 and 26 and for the plates of the amplifier tubes 25 and 26, is obtained from a transformer 30, and as explained hereinafter, the voltage of line 6 is also applied to the plate of the amplifier tubes 25 and 26. The primary winding 31 of this transformer is fed from a pair of slip rings connected to two commutator bars 180 electrical degrees apart on the motor, which deliver 80 volts at 20 cycles per second to the slip rings. A secondary winding 32 of the transformer has its ends connected to the plates of tubes 25 and 26 respectively, and supplies current to those plates through a circuit traced hereinafter. A secondary winding 35 of the transformer is connected across the filaments of tubes 25 and 26 in parallel. A secondary winding 36 of the transformer 31 is connected across the filament of tube 21. The line 6 supplies direct current to the motor, at, for example 110 volts, and also serves as a source of positive "C" voltage for polarizing the grids of the amplifier tubes 25 and 26 from the positive line conductor through lead 72 and resistance 22, the filaments of these tubes being connected to the negative conductor of line 6 by conductor 65. A condenser 37 connected across the motor regulating field winding 10 suppresses voltage fluctuations across that winding, of frequencies of the order of double that supplied by the slip rings. This condenser may have a capacity of, for example, 0.1 mf.

The curve in Fig. 2 is the voltage-frequency characteristic, or voltage-speed characteristic, of the generator 11 and filter 20 combined. The frequency varies with the motor speed. As the motor accelerates from standstill, the voltage at the output terminals of the filter rises, due to the rise in the increasing terminal voltage of the generator, until the frequency reaches the neighborhood of the frequency c, which is at about 700 cycles, the cut-off frequency of the filter. As the frequency increases above the cut-off frequency, the voltage at the output terminals of the filter decreases. For reasons made apparent hereinafter, the constants of the system are so adjusted that the normal operating point for the motor, or in other words the point of the curve which corresponds to normal motor speed, is on the steep portion of the curve which lies just above the cut-off frequency and has negative slope, for example the point p.

The motor is started by closing a switch (not shown) for connecting the line 6 to the generator (not shown) from which the line derives power. This puts full shunt field current on the motor from the upper or positive conductor of the line, through the fixed field resistance unit 50. Armature current for the motor flows from the positive line conductor through a starting resistance 52, for example three ohms, through starting series field winding 9, permanent series field winding 7, through the armature and back to the negative conductor of line 6. The motor therefore starts as a compound wound motor having a strong field with a fixed resistance in the armature circuit. When the speed of the motor has reached about 750 R. P. M. the voltage drop across the armature, due to the counter E. M. F., has risen to a value sufficient to cause operation of a starting relay 53. The winding of this relay is in a diagonal of a Wheatstone bridge circuit, two arms of the bridge consisting of resistance units 54 and 55 respectively, having their junction at one end of the diagonal, a third arm of the bridge consisting of the starting resistance 52 and field winding 9, and the fourth arm consisting of the field winding 7 and the armature. The upper contact of this relay connects the right hand end of permanent series field winding 7 directly to the positive conductor of line 6, thereby short-circuiting the 3 ohm series resistance and the starting field winding 9 of the motor. This converts the motor into a compound wound motor directly connected to the line. The lower contact of the starting relay applies E. M. F., approaching a voltage of 80 volts and a frequency of 20 cycles per second as the motor approaches normal speed, from the slip rings on the motor to the primary winding 31 of the transformer 30, thereby causing a secondary winding 32 to impress plate voltage on the amplifier tubes 25 and 26, space current from which flows through the regulating field winding 10. This voltage is impressed on the plates in superposition on the line voltage, the circuit involved extending from the positive conductor of line 6 through regulating field winding 10 and condenser 37 in parallel, conductor 62, the two halves of winding 32 and the space discharge paths of tubes 25 and 26, and conductor 65, to the negative conductor of line 6. At the same time the alternator is impressing high frequency on the filter 20, the output termination R of which is connected to the plate of the rectifier tube 21. Since this is a low-pass filter and the motor has attained considerable speed but is not yet fully up to normal speed, the motor is still operating on the part of the curve of Fig. 2 which has a slope of positive sign and the detector tube current is large and produces an IR drop in the 100,000 ohm coupling resistance 22 which drives the grids of the amplifier tubes 25 and 26 negative, thereby suppressing current through the regulating field of the motor and giving the motor a weak field which tends to increase its speed.

The motor therefore will continue to accelerate until the speed reaches the value corresponding to the cut-off frequency of the low-pass filter, whereupon the plate voltage applied to the detector tube decreases, consequently decreasing the current through the coupling resistance and decreasing the negative "C" voltage on the grids of the amplifier tubes 25 and 26. This causes a sudden increase in the space current of the amplifier, thereby strengthening the regulating field and preventing a further increase in speed. The motor has thus accelerated to its normal speed.

In earlier stages of the acceleration, that voltage at the output of the filter which is due to the generator is low, and positive potential applied from line 6 to the grids of tubes 25 and 26 through the conductor 72 and resistance 22 tends to cause the regulating field to be strong; and where it is permissible to dispense with the auxiliary starting field this effect of the regulator may be used in causing the motor torque and counter E. M. F. and field strength to have the requisite values for the low speeds of the motor.

A manner in which the system may be operated to maintain constant motor speed under varying operating conditions, as for example varying line voltage or varying load on the motor will now be described. The normal speed of the motor corresponds to, say, the point $p$ on the curve of Fig. 2. When there occurs an increase in line voltage, there results a decrease in filter output voltage and in plate voltage of tube 21, and therefore a decrease in plate current of tube 21 and a consequent increase in plate current of tubes 25 and 26, thereby tending to prevent a rise in speed. If on the other hand, the line voltage decreases there results an increase in filter output voltage and plate voltage of tube 21, and therefore in plate current of tube 21, and consequent decrease in plate current of tubes 25 and 26, thereby tending to prevent a decrease in speed. Should there occur an increase in load on the motor, tending to slow down the motor to a speed lower than normal, the system will operate in the manner just described in connection with compensation for line voltage decrease, to maintain normal speed. Should the load on the motor decrease, tending to cause the motor speed to exceed its normal value, the system will operate in the manner described above in connection with the compensation for increase of line voltage, to maintain normal motor speed.

The slope of that portion of the characteristic of the generator and filter over which the system operates to maintain constant speed should be sufficiently steep to obtain the desired precision of regulation. However, the filter cut-off should not be so sharp as to make the slope of this operating portion of the curve sufficiently steep to result in hunting or undue instability in the system.

The amplifier tubes 25 and 26 serve as a full wave rectifier to rectify the waves induced in the secondary winding 32 under control of the grid bias, for energizing the regulating field winding; and the superposition, upon the voltage waves induced in winding 32, of the direct voltage from line 6, increases the useful portion of those waves, by raising the mean positive value of the resultant voltage applied to the plates of tubes 25 and 26, or in other words by, in effect, shifting the zero axis of the waves downwardly.

The filaments of tubes 25 and 26 are connected to the negative conductor of line 6 by lead 65. The grids of these tubes are connected to the positive conductor of the line 6 through resistance 22 and lead 72. When the speed of the motor reaches a value corresponding to a frequency somewhat higher than the frequency at point $p$ the plate of the rectifier tube 21 is no longer supplied with power at sufficient voltage to overcome the voltage drop in resistance 22 due to the current drawn by the grids of tubes 25 and 26 from the positive line conductor through lead 72. Since space current no longer flows through the detector, the current through the regulating field winding is large, the grids of the amplifier tubes being positive with respect to their filaments. Therefore, there is a very strong tendency to slow the motor down.

What is claimed is:

1. Means for regulating a characteristic of an electrical system, comprising an alternator, a motor driving said alternator at a speed sufficient to produce high frequency waves, a low-pass filter fed by said alternator, said filter having a steeply sloping attenuation characteristic in the region of the frequency of said alternator when the characteristic of said system is normal, an electric space discharge tube for rectifying the current from said filter, and means responsive to the rectified alternating current for regulating said characteristic.

2. In a speed regular system for a motor having a regulating field winding, a generator supplying an alternating current having a frequency varying according to the speed of said motor, a low pass filter connected to said generator, said filter having a steeply sloping attenuation characteristic in the region of the frequency of said generator when the motor is operating at normal speed, and rectifying and amplifying means connected to said filter and operating independently of moving parts for controlling said field winding to maintain the motor speed substantially constant, said means being the largest load on said generator.

3. In a speed regulator system for a motor having a regulating field winding, a source of alternating current having a frequency varying in accordance with the speed of said motor, a low pass filter supplied with current from said source, said filter having a steeply sloping attenuation characteristic in the region of the frequency of said source when the motor is operating at normal speed, and means operating independently of moving parts and comprising an electric space discharge device connected to said filter for controlling said field winding to maintain the motor speed substantially constant, said means being the largest load on said source.

4. In a regulator system for a dynamo-electric machine having a regulating field winding, the combination comprising a source of electrical variations, the frequency of which varies in accordance with a characteristic of said machine, a low pass filter connected to said source, said filter having a steeply sloping attenuation characteristic in the region of the frequency of said source when the machine characteristic is normal, an electric space discharge device serving as a rectifier and a coupling means in circuit with said filter, and space discharge means connected across said coupling means and serving as an amplifier to control said field winding and maintain said characteristic of the machine substantially constant, said source being connected to the space discharge means through said coupling means independently of any other load.

5. In a speed regulator system for a motor having a regulating field winding, a source of alternating current having a frequency varying according to the speed of the motor, a low pass filter connected to said alternating current source, said filter having a steeply sloping attenuation characteristic in the region of the frequency of the supplied current when the motor is operating at normal speed, and means operating independently of moving parts and comprising electric space discharge tubes controlled by the current from said filter for controlling said field winding to maintain the motor speed substantially constant, said source being connected to the space discharge tubes through said filter independently of any other load.

6. In a regulator system, a motor having a regulating field winding, a generator operated by said motor to supply current having a frequency varying in accordance with the speed of said motor, a low pass filter supplied with current from said generator, said filter having a steeply sloping attenuation characteristic in the region of the frequency of the generator when the motor is operating at normal speed, an electric space discharge device serving as a rectifier and a coupling resistance connected in circuit with said filter, means for supplying a low frequency current from said motor, and amplifying means comprising electron space discharge tubes connected across said coupling resistance and supplied with space current from said low frequency source for controlling said field winding to maintain the motor speed substantially constant.

7. In a regulator system, a dynamo-electric machine having a regulating field winding, two electric space discharge tubes serving as an amplifier and having input and output circuits, means for energizing said input circuits according to an operating characteristic of said machine, and means for supplying alternating current to the output circuits of said tubes so as to effect full wave rectification, said output circuits being connected to said field winding for maintaining said characteristic substantially constant.

8. In a regulator system, a dynamo-electric machine, a source of alternating current, two electric space discharge tubes having input and output circuits, means for energizing said input circuits in parallel according to an operating characteristic of said machine, means for connecting said source of alternating current in opposite relation to said output circuits, and means for connecting said output circuits in parallel relation to said field winding to maintain said characteristic substantially constant.

9. In a regulator system, a motor having a regulating field winding, a source of direct current for operating said motor, a source of alternating current obtained from said motor, means for obtaining a potential which varies according to, but at a higher rate than, the speed of said motor, two three element space discharge tubes having the input circuits thereof energized in parallel by said potential and output circuits thereof connected in parallel with each other and in series with said source of direct current to said field winding, and means for connecting said source of alternating current in opposite relation to said output circuits.

10. In a regulator system, a motor having a regulating field winding, a source of alternating current obtained from said motor, means for obtaining a source of potential which varies according to, but at a higher rate than, the speed of said motor, two three element space discharge tubes having the output circuits thereof connected in parallel to said field winding and the input circuits connected in parallel to said source of potential. and means for connecting said source of alternating current in opposite relation to the output circuits of said tubes.

11. In a regulator system for a dynamo-electric machine having a regulating field winding, a coupling resistance, means for impressing a potential on said resistance which varies according to a characteristic of the machine, a source of substantially constant counter electromotive force connected to said resistance, and amplifying means operating independently of moving parts connected to the resistance for controlling said field winding.

12. In a regulator system for a dynamo-electric machine having a regulating field winding, an amplifier comprising a three element space discharge device and having the output circuit connected to said field winding, means for impressing a potential on the input circuit of said device which varies according to a characteristic of said machine, and means for impressing a substantially constant counter electromotive force on said input circuit.

13. In a regulator system for a dynamo-electric machine having a regulating field winding, a coupling resistance, means for impressing a potential on said resistance which varies according to a characteristic of said machine, a source of substantially constant counter electromotive force connected to said resistance, and a three element space discharge tube having the input circuit thereof connected to said resistance and the output circuit thereof connected to said field winding for maintaining the machine characteristic substantially constant.

14. In a speed regulator system for a motor having a regulating field winding, a source of alternating current having a frequency varying according to a characteristic of said machine, a low pass filter connected to said source of current, a coupling resistance, rectifying means for connecting said coupling resistance to the output circuit of said filter, a source of substantially constant counter electromotive force connected to said coupling resistance, and amplifying means connected to said coupling resistance and controlled according to the potential thereon, said amplifying means comprising three element space discharge tubes for effecting changes in the field winding current proportional to the potential on said coupling resistance.

15. In a regulator system, a dynamo-electric machine having a regulating field winding, a coupling resistance, means for impressing a potential on said coupling resistance which varies according to a characteristic of said machine, a source of substantially constant counter electromotive force connected to said coupling resistance, amplifying means comprising two space discharge devices having input and output circuits, said input circuits being connected in parallel to said coupling resistance and said output circuits being connected to said field winding, and means for supplying alternating space current to said output circuits so as to effect full wave rectification.

In witness whereof we hereunto subscribe our names this 3rd day of August A. D., 1926.

HUGH M. STOLLER.
EDMUND R. MORTON.